(12) United States Patent
Ogasawara et al.

(10) Patent No.: US 10,700,616 B2
(45) Date of Patent: Jun. 30, 2020

(54) POWER CONVERSION DEVICE CANCELING A COMMON MODE VOLTAGE

(71) Applicants: NATIONAL UNIVERSITY CORPORATION HOKKAIDO UNIVERSITY, Sapporo-shi (JP); TOSHIBA MITSUBISHI-ELECTRIC INDUSTRIAL SYSTEMS CORPORATION, Chuo-ku (JP)

(72) Inventors: Satoshi Ogasawara, Sapporo (JP); Shunsuke Ohara, Sapporo (JP); Masatsugu Takemoto, Sapporo (JP); Yushin Yamamoto, Chuo-ku (JP)

(73) Assignees: NATIONAL UNIVERSITY CORPORATION HOKKAIDO UNIVERSITY, Sapporo-shi (JP); TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 0 days.

(21) Appl. No.: 15/765,318

(22) PCT Filed: Oct. 27, 2016

(86) PCT No.: PCT/JP2016/081892
§ 371 (c)(1),
(2) Date: Apr. 2, 2018

(87) PCT Pub. No.: WO2017/077939
PCT Pub. Date: May 11, 2017

(65) Prior Publication Data
US 2018/0278176 A1 Sep. 27, 2018

(30) Foreign Application Priority Data

Nov. 6, 2015 (JP) .................. 2015-218306

(51) Int. Cl.
*H02M 7/48* (2007.01)
*H02P 27/08* (2006.01)
*H02M 1/12* (2006.01)

(52) U.S. Cl.
CPC .............. *H02M 7/48* (2013.01); *H02P 27/08* (2013.01); *H02M 2001/123* (2013.01); *H02M 2007/4815* (2013.01)

(58) Field of Classification Search
CPC ............ H02M 1/12; H02M 1/14; H02M 1/15; H02M 2001/123; H02M 2007/4815
See application file for complete search history.

(56) References Cited

U.S. PATENT DOCUMENTS 4,560,851 A * 12/1985 Tsukamoto ....... H02M 7/53803
219/625
5,831,842 A * 11/1998 Ogasawara ............. H02M 1/12
363/40

(Continued)

FOREIGN PATENT DOCUMENTS

EP          0 809 346 A1    11/1997
JP          10-94244 A       4/1998

(Continued)

OTHER PUBLICATIONS

International Search Report dated Dec. 13, 2016 in PCT/JP2016/081892 filed Oct. 27, 2016.

(Continued)

*Primary Examiner* — Yusef A Ahmed
(74) *Attorney, Agent, or Firm* — Oblon, McClelland, Maier & Neustadt, L.L.P.

(57) ABSTRACT

A power conversion device that converts electric power by having a power semiconductor element perform a switching operation includes a voltage detector detecting a common mode voltage generated in the switching operation of the power semiconductor element, a voltage control power (Continued)

supply that generates a voltage opposite in polarity to and as high as the common mode voltage with a circuit that amplifies power of the common mode voltage detected by the voltage detector, and a voltage superimposition structure canceling the common mode voltage not lower than a switching frequency generated in the switching operation of the power semiconductor element, by superimposing the voltage generated by the voltage control power supply on an output from the power conversion device.

3 Claims, 10 Drawing Sheets

(56) References Cited

U.S. PATENT DOCUMENTS

| | | | |
|---|---|---|---|
| 6,134,126 A * | 10/2000 | Ikekame | H02J 3/01 307/105 |
| 9,130,542 B1 * | 9/2015 | Ishihara | H03H 11/126 |
| 9,450,512 B2 * | 9/2016 | Bremicker | H02M 1/32 |
| 2001/0045863 A1 * | 11/2001 | Pelly | H02M 1/12 327/552 |
| 2002/0075702 A1 * | 6/2002 | Igarashi | H02M 1/12 363/35 |
| 2004/0004514 A1 * | 1/2004 | Pelly | H02M 1/12 327/552 |
| 2006/0227483 A1 * | 10/2006 | Akagi | H02M 1/12 361/118 |
| 2008/0272115 A1 * | 11/2008 | Suenaga | H02M 3/33569 219/702 |
| 2009/0174350 A1 * | 7/2009 | Kuroda | H02M 7/53875 318/400.11 |
| 2010/0148740 A1 * | 6/2010 | Saitoh | H02M 3/1582 323/283 |
| 2011/0103106 A1 * | 5/2011 | Sato | H02M 1/126 363/37 |
| 2011/0170322 A1 * | 7/2011 | Sato | H02J 9/062 363/40 |
| 2012/0068655 A1 * | 3/2012 | Inuduka | H02M 1/126 318/494 |
| 2012/0200171 A1 * | 8/2012 | Sato | H02J 9/062 307/113 |
| 2013/0147419 A1 * | 6/2013 | Sakai | H02M 1/12 318/722 |
| 2014/0140112 A1 * | 5/2014 | Zhou | H02M 1/126 363/40 |
| 2014/0361792 A1 * | 12/2014 | Nakamura | G01D 5/2073 324/655 |
| 2015/0003124 A1 * | 1/2015 | Sakai | H02M 1/12 363/37 |

FOREIGN PATENT DOCUMENTS

| | | |
|---|---|---|
| JP | 2000-201044 A | 7/2000 |
| WO | WO 2008/088040 A1 | 7/2008 |

OTHER PUBLICATIONS

Office Action dated Dec. 4, 2018 in corresponding Japanese Patent Application No. 2017-548732 (with English Translation), 8 pages.

Office Action dated Dec. 5, 2018 in corresponding Canadian Patent Application No. 3,001,121, 4 pages.

Office Action dated May 16, 2019 in Korean Patent Application No. 10-2018-7012198 (with unedited computer generated English translation).

Extended European Search Report dated Jun. 13, 2019 in Patent Application No. 16862000.3, 7 pages.

Office Action dated Nov. 22, 2019, in Korean Patent Application No. 10-2018-7012198, with English-language Translation.

Office Action dated Dec. 18, 2019, in Indian Patent Application No. 201817013926, with English-language Translation.

Office Action dated Aug. 21, 2019, in Canadian Patent Application No. 3,001,121.

Office Action dated Aug. 28, 2019, in Chinese Patent Application No. 201680064209.1 w/English-language Translation.

* cited by examiner (A)

(B)

(C)

POWER CONVERSION DEVICE CANCELING A COMMON MODE VOLTAGE

TECHNICAL FIELD

The present invention relates to a scheme for canceling a common mode voltage generated in power conversion based on a switching operation of a power conversion device such as a power semiconductor element represented by an inverter.

BACKGROUND ART

For example, in a power conversion device such as a voltage type PWM inverter which controls an operation with a motor being defined as a load, a carrier frequency of the voltage type PWM inverter has recently been increased with expansion of applications and improvement in characteristics of a power semiconductor element.

With increase in frequency of such a voltage type PWM inverter, electromagnetic interference (EMI) caused by the voltage type PWM inverter has posed a serious problem.

The cause of electromagnetic interference by the voltage type PWM inverter mainly resides in a current which flows through a ground line.

In this connection, Japanese Patent Laying-Open No. 10-94244 has proposed a scheme for lowering a leakage current by suppressing a common mode voltage output from the inverter by using an active element.

CITATION LIST

Patent Document

PTD 1: Japanese Patent Laying-Open No. 10-94244

SUMMARY OF INVENTION

Technical Problem

The technique described in the publication, however, achieves suppression by setting a common mode voltage output from the inverter to 0, and hence a very large common mode transformer is required. Therefore, a circuit scale has been large and reduction in size has been difficult.

The present invention was made to solve the problem as above, and an object is to provide a power conversion device which is capable of achieving reduction in size based on reduction in scale of a circuit.

Solution to Problem

A power conversion device which converts electric power by having a power semiconductor element perform a switching operation according to one aspect of the present invention includes voltage detection means for detecting a common mode voltage generated in the switching operation of the power semiconductor element, a voltage control power supply which generates a voltage which is opposite in polarity to and as high as the common mode voltage with a circuit which amplifies power of the common mode voltage detected by the voltage detection means, and voltage superimposition means for canceling the common mode voltage not lower than a switching frequency generated in the switching operation of the power semiconductor element, by superimposing the voltage generated by the voltage control power supply on an output from the power conversion device.

Preferably, the voltage superimposition means includes a common mode transformer having a multiwinding and a capacitor. A resonance frequency based on the common mode transformer and the capacitor of the voltage superimposition means is set to be between a zero-phase voltage frequency of the power semiconductor element and the switching frequency.

Preferably, the power conversion device further includes remaining voltage detection means for detecting the common mode voltage of the power conversion device and the voltage control power supply superimposed by the voltage superimposition means. The voltage superimposition means adds the common mode voltage detected by the remaining voltage detection means and superimposes the common mode voltage on the output from the power conversion device.

Preferably, an operational amplifier which performs inverting amplification based on comparison between the common mode voltage detected by the remaining voltage detection means and a zero-phase voltage of the common mode voltage and adjusts the voltage that is added is further included.

Advantageous Effects of Invention

The power conversion device according to the present invention can be reduced in size based on reduction in scale of a circuit.

DESCRIPTION OF EMBODIMENTS

Figure 1:
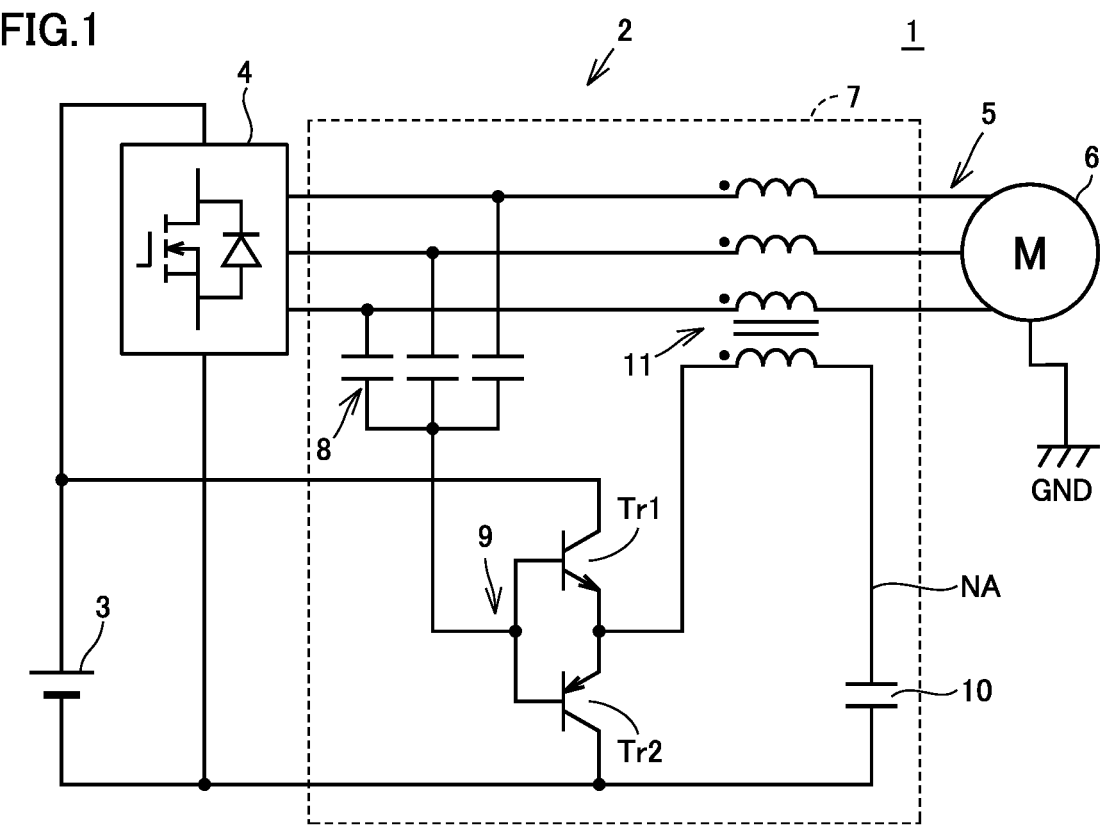
FIG. 1 is a diagram illustrating a configuration of a motor control system 1 based on a first embodiment.

The present embodiment will be described in detail with reference to the drawings. The same or corresponding elements in the drawings have the same reference characters allotted and description thereof will not be repeated.

An embodiment of the present invention will be described below with reference to the drawings.

First Embodiment

FIG. 1 is a diagram illustrating a configuration of a motor control system 1 based on a first embodiment.

Referring to FIG. 1, motor control system 1 includes an induction motor 6 and a power conversion device 2 according to the present invention.

Power conversion device 2 includes a voltage type PWM inverter 4 and a common mode suppression circuit 7 which suppresses a common mode voltage.

Voltage type PWM inverter 4 (which is also simply referred to as an inverter) is connected to a direct-current power supply 3 and converts this direct-current voltage into a three-phase alternating-current voltage through a switching operation of a power semiconductor element (such as an IGBT or SiC).

The alternating-current voltage resulting from conversion by inverter 4 is connected to induction motor (motor) 6 through a three-phase cable 5 and a frame of induction motor 6 is connected to a ground voltage GND through a ground line.

Common mode suppression circuit 7 is provided between inverter 4 and induction motor (motor) 6.

Common mode suppression circuit 7 includes a capacitor group 8 star-connected to three-phase alternating-current output ends of inverter 4 and detecting a common mode voltage, a push-pull emitter follower circuit 9 implemented by complementary transistors which amplify power of the common mode voltage obtained from a neutral point thereof, a common mode transformer 11 which has a primary side coil receiving an output from emitter follower circuit 9 and having a secondary side coil provided in three-phase cable 5, and a capacitor 10 connected in series to the primary side coil of common mode transformer 11.

Common mode suppression circuit 7 is connected to direct-current power supply 3 which is an input side of inverter 4 as a driving power supply.

Emitter follower circuit 9 includes bipolar transistors Tr1 and Tr2 connected in series to direct-current power supply 3 and having their gates connected to capacitor group 8.

Emitter follower circuit 9 desirably has high responsiveness and low output impedance characteristics which allow a faithful output of a common mode voltage of inverter 4.

Emitter follower circuit 9 implements a voltage control power supply which amplifies power of a detected common mode voltage and generates a voltage which is opposite in polarity to and as high as the common mode voltage.

A capacitor comparable in output capacity to the power semiconductor element of inverter 4 is desirably employed as a capacitor in capacitor group 8.

Since emitter follower circuit 9 is sufficiently high in input impedance, it can sufficiently accurately detect a common mode voltage of inverter 4 even when it is implemented by a capacitor of a small capacity.

Since emitter follower circuit 9 is sufficiently low in output impedance, an excitation current Im of common mode transformer 11 is supplied only from emitter follower circuit 9.

Since a high power supply voltage is obtained from the input side of inverter 4 as the driving power supply for common mode suppression circuit 7, a winding of which turn ratio between the primary side and the secondary side of common mode transformer 11 is 1:1 is employed.

A scheme of suppression of a common mode voltage will now be described.

Figure 2:
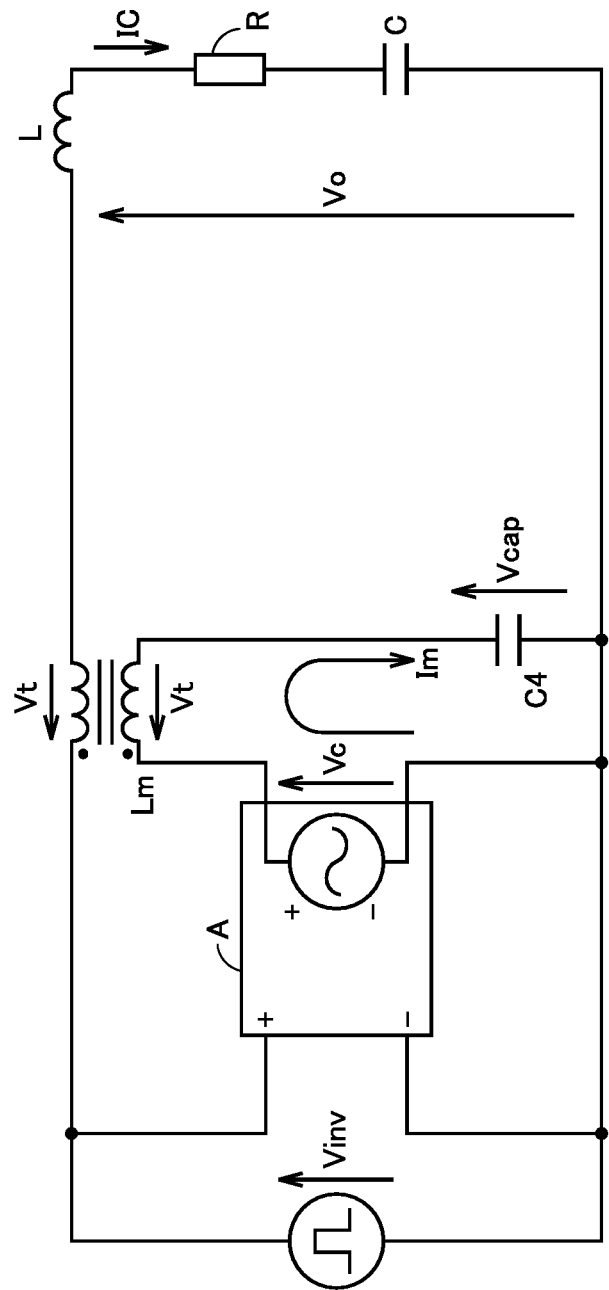
FIG. 2 is a diagram illustrating an equivalent circuit for a common mode of a common mode suppression circuit 7 based on the first embodiment.

FIG. 2 is a diagram illustrating an equivalent circuit for a common mode of common mode suppression circuit 7 based on the first embodiment.

As shown in FIG. 2, a capacitance C represents a stray capacitance between a winding of the motor and the frame, an inductance L represents an inductance of a line through the entire paths, and a resistance R represents a resistive component of the line through the entire paths. Common mode transformer 11 with a leakage inductance being ignored is a transformer having an excitation inductance Lm and a turn ratio of 1:1. Emitter follower circuit 9 can be expressed as a voltage control power supply A which receives an input of a common mode voltage Vinv and outputs a voltage Vc as high as that.

Voltage Vinv represents a common mode voltage output from the inverter. A current Im represents an excitation current for the common mode transformer. A current Ic represents a common mode current which flows through the motor. A voltage Vo represents a common mode voltage after the common mode voltage is suppressed.

When one phase of inverter 4 makes switching, common mode voltage Vinv output from inverter 4 is varied stepwise.

Common mode transformer 11 connected to an output end of emitter follower circuit 9 is expressed only by excitation inductance Lm with a leakage inductance being ignored. A capacitance C4 of capacitor 10 is shown.

Each time inverter 4 is switched, an output zero-phase voltage from inverter 4, that is, a common mode voltage, is varied stepwise. Thus, common mode current IC flows to a ground line through the stray capacitance between the winding of induction motor (motor) 6 and the frame.

Common mode voltage Vinv contains a zero-phase voltage component Vlow and a voltage Vhi which is a component not lower than a switching frequency.

A value for capacitance C4 of capacitor 10 is set such that a resonance frequency of excitation inductance Lm and capacitance C4 is between a zero-phase voltage frequency and the switching frequency.

In this case, a voltage Vt to be superimposed on the common mode voltage in accordance with excitation inductance Lm is shown in the following expression 1.

$$Vt = Vhi \quad \text{(Expression 1)}$$

A voltage Vcap produced in capacitor 10 is shown in the following expression 2 based on zero-phase voltage component Vlow.

$$Vcap = Vlow \quad \text{(Expression 2)}$$

Common mode voltage Vinv output from the inverter is shown in the following expression 3.

$$Vinc = Vc \quad \text{(Expression 3)}$$

Voltage Vcap satisfies relation in the following expression 4.

$$Vcap = Vc - Vt \quad \text{(Expression 4)}$$

The common mode voltage further satisfies relation in the following expression 5.

$$Vo = Vinv - Vt \quad \text{(Expression 5)}$$

The following relation is satisfied based on the expressions 2, 4, and 5.

$$Vo = Vcap = Vlow$$

With the expression, a component not lower than the switching frequency of common mode voltage Vo is canceled and the zero-phase voltage component thereof remains.

Therefore, with the scheme according to the first embodiment, the common mode voltage output from the inverter contains the zero-phase voltage component low in frequency. The zero-phase voltage component low in frequency hardly affects electromagnetic interference.

The conventional scheme has required a very large common mode transformer in order to suppress to 0, also such a zero-phase voltage component low in frequency.

According to the configuration based on the present first embodiment, the common mode voltage not lower than the switching frequency is canceled by applying only a component not lower than the switching frequency to common mode transformer 11. Therefore, electromagnetic interference caused by the voltage type PWM inverter in a high-frequency band can be suppressed.

Since the configuration based on the present first embodiment applies only a component not lower than the switching frequency to common mode transformer 11, the common mode transformer itself can be reduced in size. According to the configuration, the power conversion device can be reduced in size based on reduction in scale of a circuit.

Second Embodiment

In the first embodiment, an ideal example in which voltage control power supply A is ideal and the common mode transformer is free from a leakage inductance is described.

Actually, however, voltage control power supply A produces strain and the common mode transformer suffers from non-linearity due to a leakage inductance, a stray capacitance, or a core material.

Therefore, it may be difficult to completely suppress a component not lower than the switching frequency of the common mode voltage.

In the present second embodiment, a scheme for more accurately lowering a common mode voltage is described.

Specifically, a feedback control scheme in which a remaining common mode voltage not lower than a switching frequency component is detected, amplified, and added on a negative side of the common mode transformer is adopted. The common mode voltage can thus further be lowered.

Figure 3:
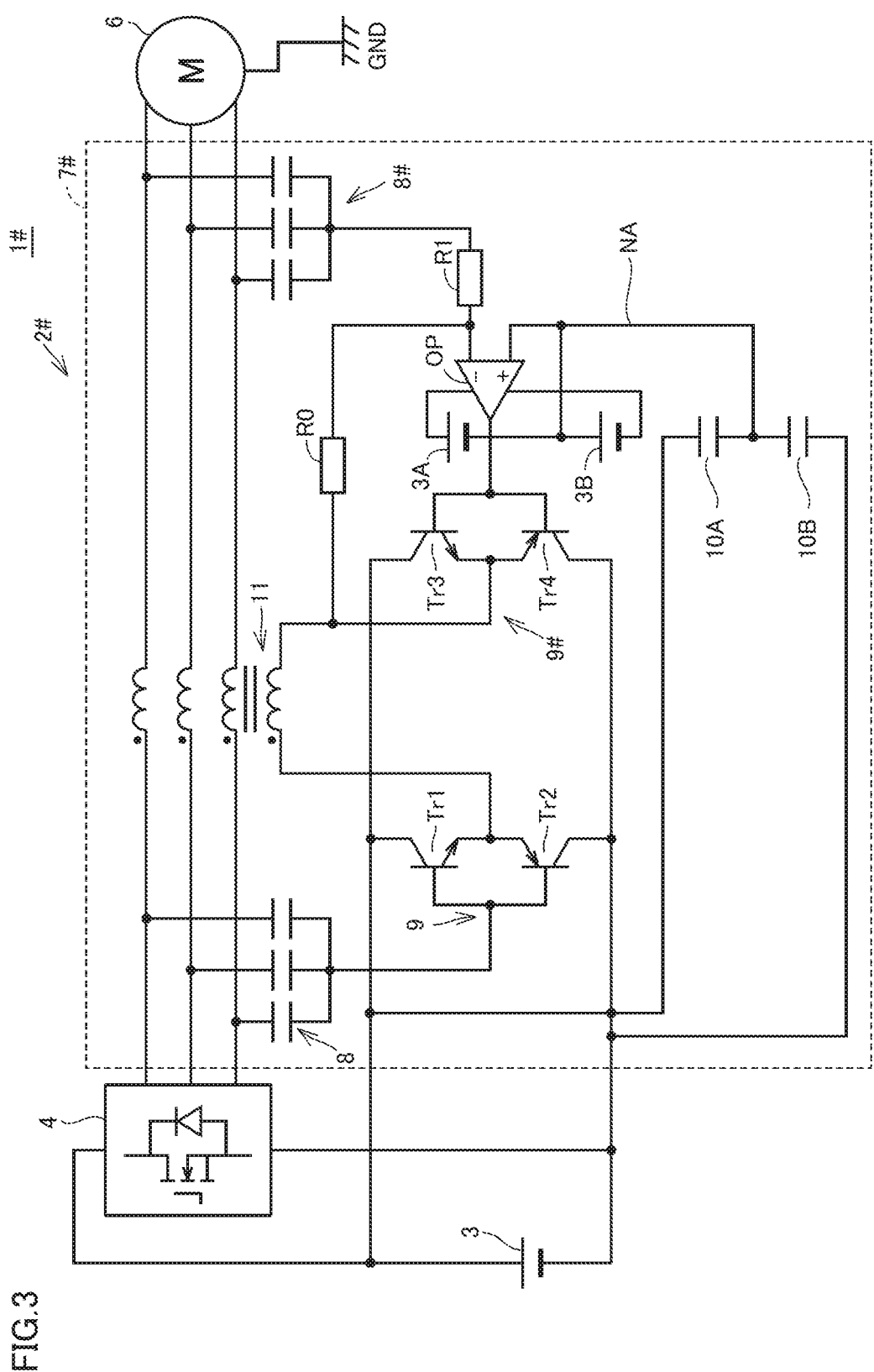
FIG. 3 is a diagram illustrating a configuration of a motor control system 1# based on a second embodiment.

FIG. 3 is a diagram illustrating a configuration of a motor control system 1# based on the second embodiment.

Referring to FIG. 3, motor control system 1# includes induction motor 6 and a power conversion device 2#.

Power conversion device 2# is different from power conversion device 2 in that common mode suppression circuit 7 is replaced with a common mode suppression circuit 7#. Since the configuration is otherwise the same, detailed description thereof will not be repeated.

As compared with common mode suppression circuit 7, common mode suppression circuit 7# further includes a capacitor group 8# star-connected to three-phase cable 5 between common mode transformer 11 and induction motor 6 and detecting a remaining common mode voltage, an operational amplifier OP, resistances R0 and R1, a push-pull emitter follower circuit 9# implemented by complementary transistors which amplify power, capacitors 10A and 10B, and direct-current power supplies 3A and 3B.

Emitter follower circuit 9# includes bipolar transistors Tr3 and Tr4 connected in series to direct-current power supply 3 and having their gates connected to an output of operational amplifier OP.

A primary side coil of common mode transformer 11 is provided between a node of connection between bipolar transistors Tr1 and Tr2 and a node of connection between bipolar transistors Tr3 and Tr4.

Capacitors 10A and 10B are connected in series to direct-current power supply 3 and has a connection node NA connected to an input on one side (a + side) of operational amplifier OP. Connection node NA is connected also to a node of connection between direct-current power supplies 3A and 3B.

Operational amplifier OP has an input on the other side (a − side) connected to capacitor group 8# with resistance R1 being interposed. Resistance R0 is provided between the input on the other side (the − side) of operational amplifier OP and an output of emitter follower circuit 9#.

Figure 4:
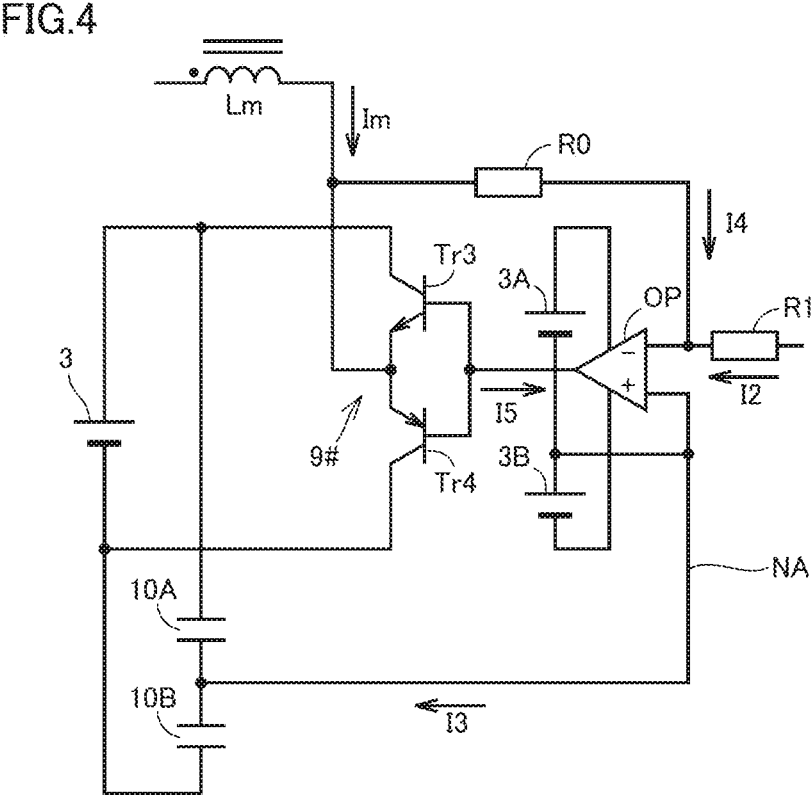
FIG. 4 is a circuit configuration diagram around a voltage control power supply A # of a common mode suppression circuit 7# based on the second embodiment.

FIG. 4 is a circuit configuration diagram around a voltage control power supply A # of common mode suppression circuit 7# based on the second embodiment.

A current which flows in a circuit around voltage control power supply A # will be described with reference to FIG. 4.

Since resistance R0 is high in resistance, a current I4 is sufficiently lower than Im.

Therefore, excitation current Im of the common mode transformer flows to emitter follower circuit 9#.

A current I5 which flows to emitter follower circuit 9# satisfies the following expression 6.

$$I5 = Im/hfe \quad \text{(Expression 6)}$$

Since currents I4 and I2 are sufficiently lower than current I5, the following expression 7 is satisfied based on the Kirchhoff's current law.

$$I3 = I5 = Im/hfe \quad \text{(Expression 7)}$$

Figure 5:
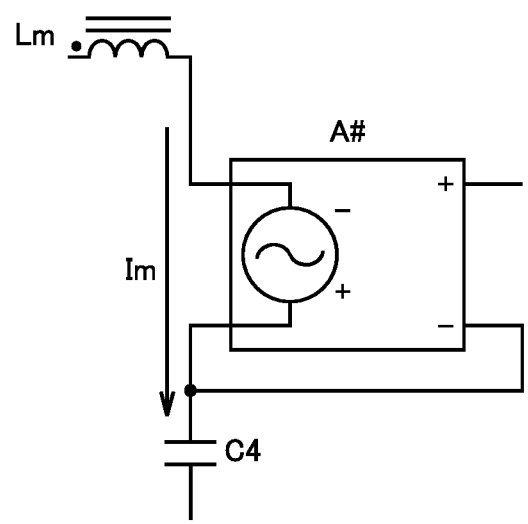
FIG. 5 is a diagram illustrating an equivalent circuit around voltage control power supply A # of common mode suppression circuit 7# based on the second embodiment.

FIG. 5 is a diagram illustrating an equivalent circuit around voltage control power supply A # of common mode suppression circuit 7# based on the second embodiment.

In FIG. 5, voltage control power supply A # is configured with operational amplifier OP, a floating power supply, and emitter follower circuit 9#. Operational amplifier OP operates as an inverting amplifier with a zero-phase voltage component being defined as a reference potential.

Figure 6:
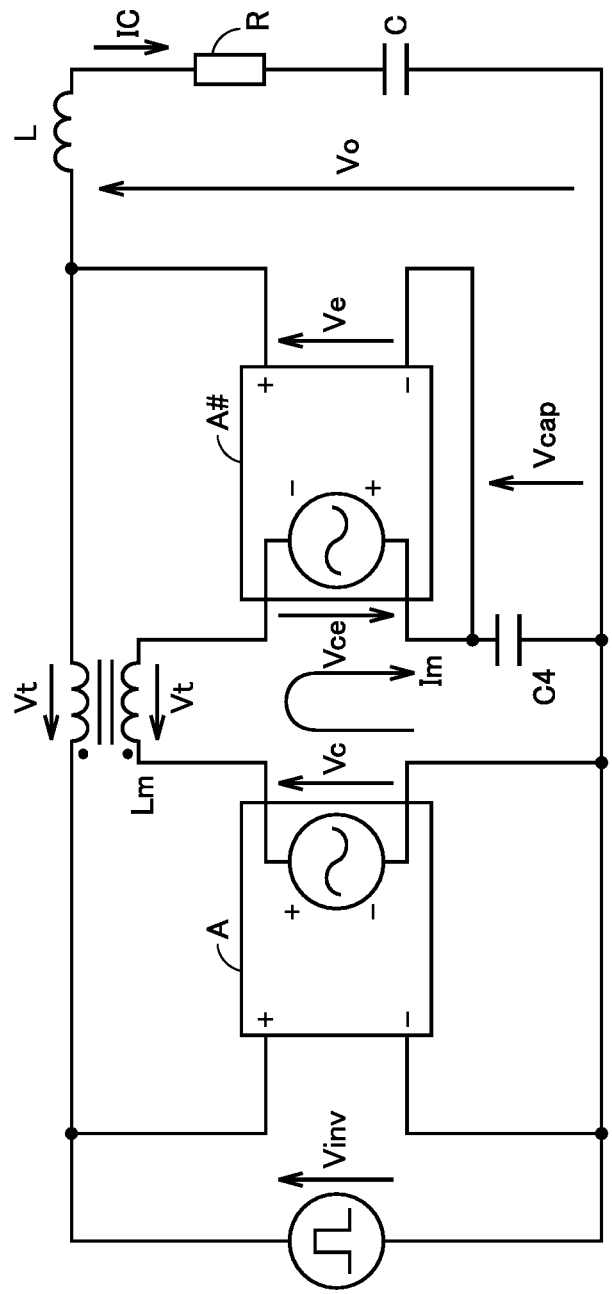
FIG. 6 is a diagram illustrating an equivalent circuit for the common mode of common mode suppression circuit 7# based on the second embodiment.

FIG. 6 is a diagram illustrating an equivalent circuit for the common mode of common mode suppression circuit 7# based on the second embodiment.

As shown in FIG. 6, capacitors 10A an 10B are charged with a base current of transistors Tr3 and Tr4 which is 1/hfe (a current amplification factor) of an excitation current of common mode transformer 11 and discharge the base current, and excitation inductance Lm and a combined capacitance C4 of capacitors 10A and 10B form a resonance circuit.

Though such a scheme that the circuit described with reference to FIG. 2 cancels a common mode voltage only through feedforward control has been described, according to the scheme based on the second embodiment, a remaining common mode voltage which is not completely canceled only through feedforward control is canceled through feedback control.

Voltage control power supply A # having a gain G is added to the equivalent circuit in FIG. 2.

The deformed expression 4 described with reference to FIG. 2 satisfies the following expression 8.

$$Vt = Vc - V\text{cap} \quad \text{(Expression 8)}$$

In the equivalent circuit, relation in the following expression 9 is satisfied in accordance with an output Vce from voltage control power supply A #.

$$Vt = Vc + Vce - V\text{cap} \quad \text{(Expression 9)}$$

Output Vce from voltage control power supply A # serves as a voltage which compensates for an error voltage which is not completely canceled only through feed word control.

Since most of a common mode voltage is compensated for by voltage Vc, voltage Vce is sufficiently smaller in amplitude than voltage Vc. Therefore, influence by voltage Vce is ignorable and excitation current Im is mainly defined by voltage Vc.

Therefore, when capacitance C4 is set such that a resonance frequency of excitation inductance Lm and capacitance C4 is between a zero-phase voltage frequency and a switching frequency, the following expression 10 is satisfied as described with reference to FIG. 2. Capacitance C4 is shown as a combined capacitance of capacitors 10A and 10B.

$$V\text{cap} = V\text{low} \quad \text{(Expression 10)}$$

An input Ve to voltage control power supply A # is shown in the following expression 11.

$$Ve = Vo - V\text{cap} \quad \text{(Expression 11)}$$

According to the expression 10, Ve is represented a result of subtraction of a zero-phase voltage component from common mode voltage Vo.

For voltage control power supply A #, Ve represents in the following expression 12.

$$Vce = GVe \quad \text{(Expression 12)}$$

When gain G is sufficiently high, Ve is 0 owing to imaginary short-circuiting.

Therefore, the following expression 13 is satisfied.

$$Vo = V\text{cap} = V\text{low} \quad \text{(Expression 13)}$$

Vce is equal to an error voltage.

Only the zero-phase voltage component remains in common mode voltage Vo.

Voltage control power supply A # operates with the zero-phase voltage component being defined as the reference potential, and it receives an input and provides an output of only a remaining component small in amplitude.

With this resonance circuit, a midpoint between power supplies and a potential at node NA which is an amplification reference point of the operational amplifier is equal to a zero-phase voltage of the inverter.

The remaining common mode voltage detected by capacitor group 8# (C6 to C8) is subjected to inverting amplification by operational amplifier OP and added to common mode transformer 11.

Through these operations, feedback control is carried out such that the common mode voltage applied to the load of the inverter is equal to the zero-phase voltage of the inverter, and only the component not lower than the switching frequency of the common mode voltage output from the inverter is canceled.

By setting the operation reference point (ground) of the operational amplifier used for feedback control to the zero-phase voltage of the common mode voltage output from the inverter, a fast and inexpensive operational amplifier low in withstand voltage can be employed.

Figure 7:
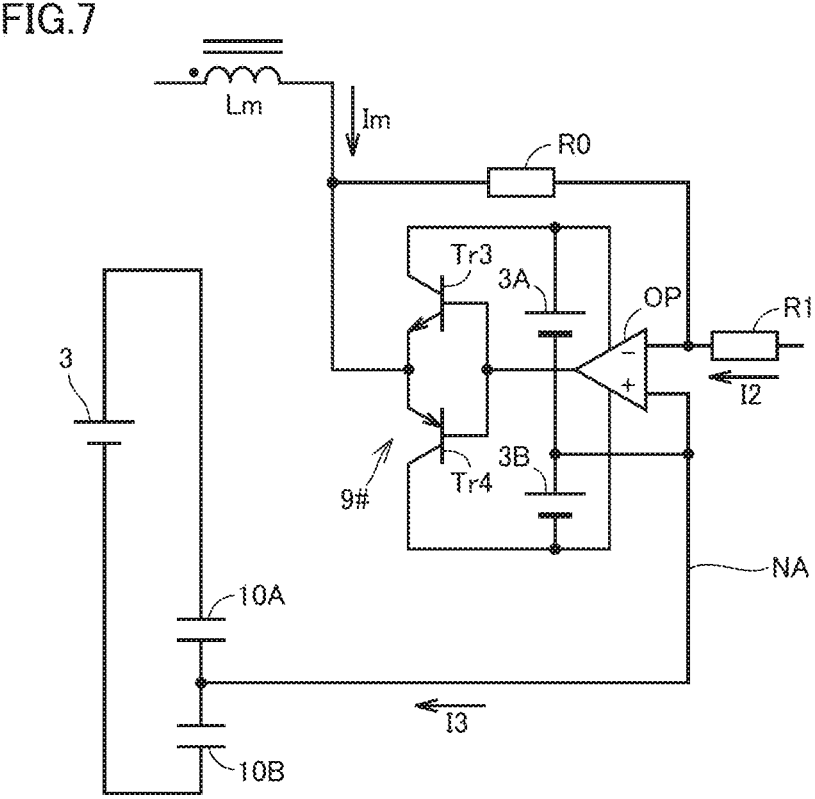
FIG. 7 is another circuit configuration diagram around voltage control power supply A #.

FIG. 7 is another circuit configuration diagram around voltage control power supply A #.

As shown in FIG. 7, emitter follower circuit 9# is configured to be connected to a floating power supply similarly to operational amplifier OP.

In such a configuration as well, no current flows to an input terminal of voltage control power supply A # and hence excitation current Im of the common mode transformer flows to capacitors 10A and 10B.

By setting resistance R1 to several kΩ or higher, a current I2 is sufficiently lower than current Im, and hence the following expression is satisfied based on the Kirchhoff's current law.

$$I3 = Im \quad \text{(Expression 14)}$$

Based on comparison with the circuit configuration in FIG. 4, the circuit configuration in FIG. 4 is lower in current which flows in the floating power supply and a capacity of the floating power supply can be lower. Since a current for charging capacitors 10A and 10B or discharged from capacitors 10A and 10B is low, a capacity can be low. According to the configuration, a scale of a circuit can further be reduced.

Example

Evaluation of characteristics of attenuation of a common mode voltage of the inverter in the first and second embodiments will be described.

A power supply voltage of the inverter was set to 200 V and a switching frequency thereof was set to 100 kHz. A sinusoidal wave of 50 Hz having a modulation factor of 0.6 was defined as an output of the inverter.

Induction motor (motor) 6 was not connected and a state without a load was set.

Figure 8:
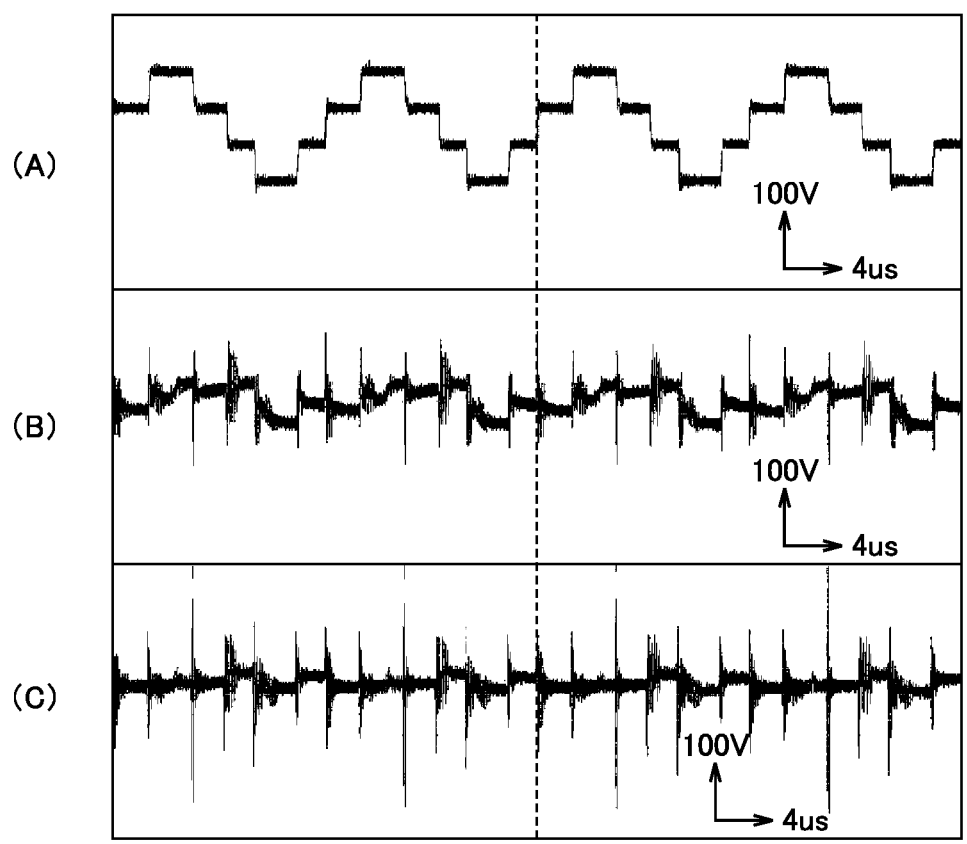
FIG. 8 is a diagram illustrating a waveform of a common mode voltage.

FIG. 8 is a diagram illustrating a waveform of a common mode voltage.

FIG. 8 (A) shows an output from the inverter when the common mode voltage is not suppressed.

FIGS. 8 (B) and (C) shows common mode voltages suppressed by common mode suppression circuits 7 and 7# based on the first and second embodiments.

A neutral point of the power supply of the inverter is set to the reference potential.

As shown in the configuration, the amplitude of 200 V shown in FIG. 8 (A) can be decreased to approximately 8 V in FIG. 8 (B) with a spike voltage being ignored. In FIG. 8 (C), the amplitude can further be decreased to approximately 2 V.

Figure 9:
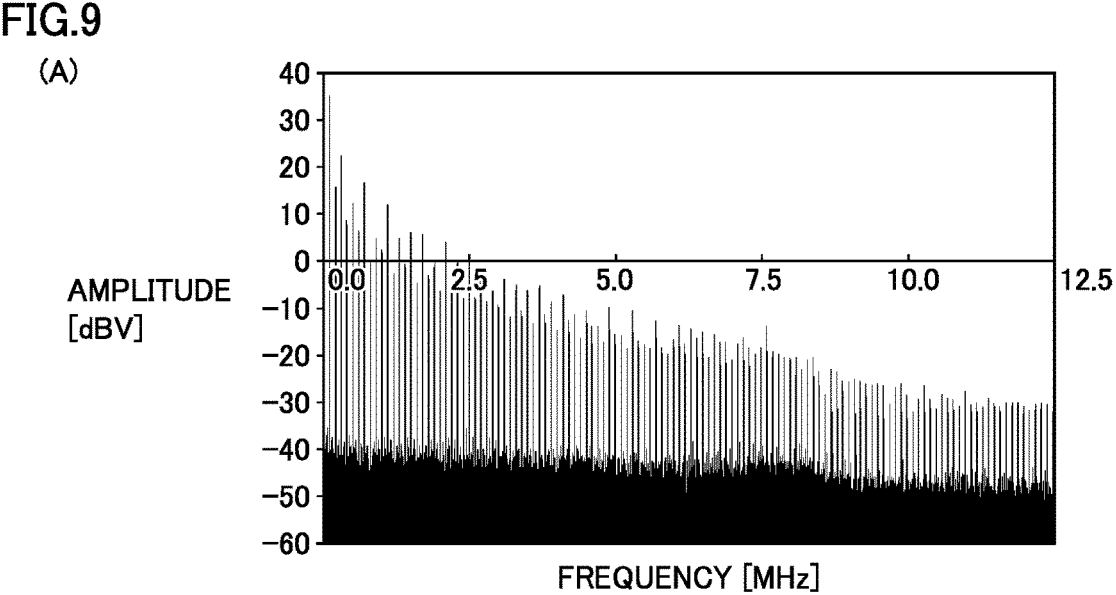
FIG. 9 is a diagram illustrating a result of FFT analysis of a common mode voltage.
Figure 9:
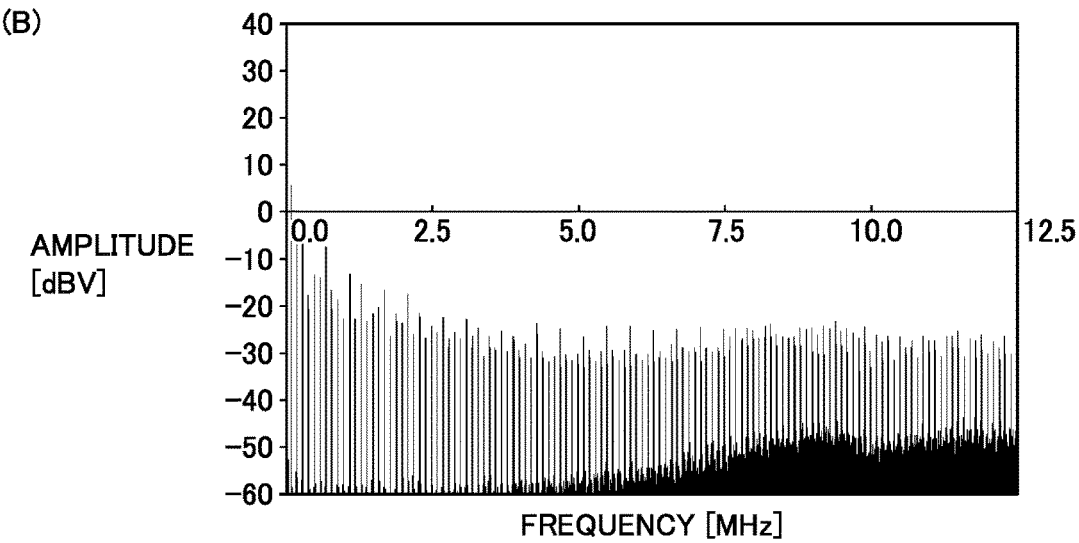
Figure 9:
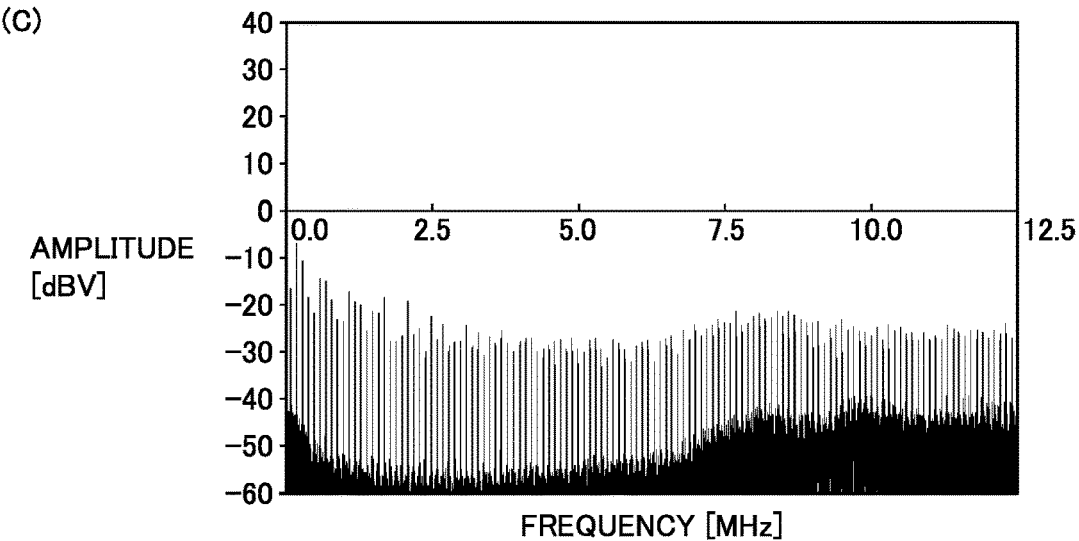

FIG. 9 is a diagram illustrating a result of FFT analysis of a common mode voltage.

FIG. 9 (A) shows a result of FFT analysis when a common mode voltage is not suppressed. FIGS. 9 (B) and (C) shows a result of FFT analysis of common mode voltages suppressed by common mode suppression circuits 7 and 7# based on the first and second embodiments.

A component which is an integral multiple of a switching frequency of 100 kHz appears.

Figure 10:
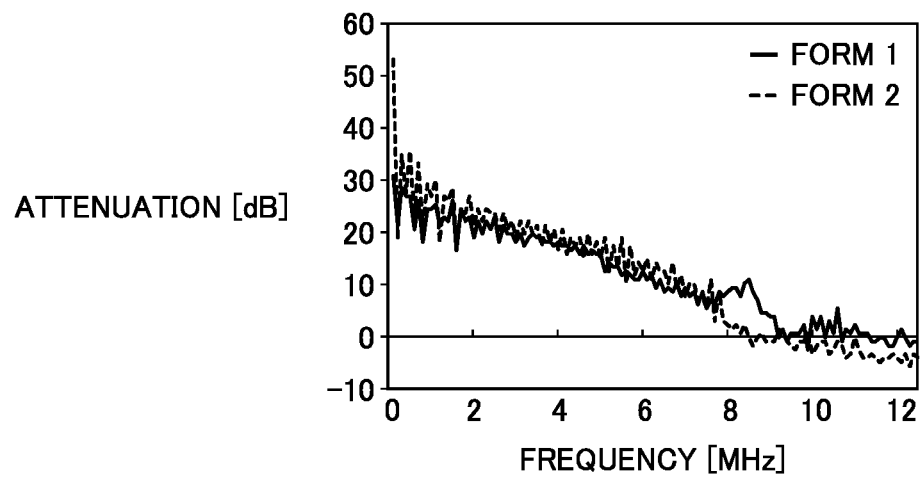
FIG. 10 is a diagram illustrating an amount of attenuation of a common mode voltage.

FIG. 10 is a diagram illustrating an amount of attenuation of a common mode voltage.

As shown in FIG. 10, in the configuration in the first embodiment, amounts of attenuation were 30 dB at 100 kHz and 10 dB at 8 MHz, respectively.

In the configuration in the second embodiment, an amount of attenuation was 53 dB at 100 kHz. An amount of attenuation was 5 dB at 8 Mhz.

Therefore, the configuration in the second embodiment is greater in amount of attenuation.

As is clear from the figure, it can be seen that the common mode suppression circuit based on the present first and second embodiments are very effective for suppression of a common mode voltage and consequent lowering in common mode current.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

Though application of the power conversion device including the voltage type PWM inverter according to the present invention to the motor control system which operates the induction motor has been described, the power conversion device is also similarly applicable to other power conversion devices which generate a common mode voltage in switching of a power semiconductor element, such as a DC-DC converter.

REFERENCE SIGNS LIST 1, 1# motor control system; 2, 2# power conversion device; 3, 3A, 3B direct-current power supply; 4 inverter; 5 three-phase cable; 6 induction motor; 7, 7# common mode suppression circuit; 8, 8# capacitor group; 9, 9# emitter follower circuit; 10, 10A, 10B capacitor; and 11 common mode transformer

The invention claimed is:

1. A power conversion device which converts electric power by having a power semiconductor element perform a switching operation, the power conversion device comprising:

voltage detection means for detecting a common mode voltage generated in the switching operation of the power semiconductor element;

a first voltage control power supply which generates a first voltage which is opposite in polarity to and as high as the common mode voltage with a first circuit which amplifies power of the common mode voltage detected by the voltage detection means;

voltage superimposition means for canceling the common mode voltage not lower than a switching frequency generated in the switching operation of the power semiconductor element, by superimposing the first voltage generated by the first voltage control power supply on an output from the power conversion device;

remaining voltage detection means for detecting a remaining common mode voltage remaining after canceling the common mode voltage by the first voltage generated from the first voltage control power supply by using the voltage superimposition means; and a second voltage control power supply which generates a second voltage which is opposite in polarity to and as high as the remaining common mode voltage with a second circuit that amplifies power of the remaining common mode voltage detected by the remaining voltage detection means; wherein the voltage superimposition means cancels the remaining common mode voltage by superimposing the second voltage generated by the second voltage control power supply on the output from the power conversion device.

2. The power conversion device according to claim 1, wherein the voltage superimposition means includes a common mode transformer having a multiwinding and a capacitor, and a resonance frequency based on the common mode transformer and the capacitor of the voltage superimposition means is set to be between a zero-phase voltage frequency of the power semiconductor element and the switching frequency.

3. The power conversion device according to claim 1, the power conversion device further comprising an operational amplifier which performs inverting amplification based on comparison between the remaining common mode voltage detected by the remaining voltage detection means and a zero-phase voltage of the common mode voltage and adjusts the second voltage that is added.

* * * * *